(12) United States Patent
Hickey

(10) Patent No.: US 12,169,307 B2
(45) Date of Patent: Dec. 17, 2024

(54) WAVEGUIDE COUPLER

(71) Applicant: RANOVUS INC., Kanata (CA)

(72) Inventor: Ryan Murray Hickey, Stittsville (CA)

(73) Assignee: RANOVUS INC., Kanata (CA)

( * ) Notice: Subject to any disclaimer, the term of this patent is extended or adjusted under 35 U.S.C. 154(b) by 48 days.

(21) Appl. No.: 17/737,743

(22) Filed: May 5, 2022

(65) Prior Publication Data

US 2022/0365285 A1 Nov. 17, 2022

Related U.S. Application Data

(60) Provisional application No. 63/188,861, filed on May 14, 2021.

(51) Int. Cl.
*G02B 6/30* (2006.01)
*G02B 6/26* (2006.01)

(52) U.S. Cl.
CPC .............. *G02B 6/305* (2013.01); *G02B 6/26* (2013.01); *G02B 6/30* (2013.01)

(58) Field of Classification Search
CPC ............. G02B 6/305; G02B 6/30; G02B 6/26
See application file for complete search history.

(56) References Cited

U.S. PATENT DOCUMENTS

| | | | | |
|---|---|---|---|---|
| 6,408,126 B1* | 6/2002 | Hoekstra | ................ | G02B 6/125 |
| | | | | 385/130 |
| 9,348,094 B1* | 5/2016 | Liu | ........................... | G02B 6/30 |
| 9,703,038 B1* | 7/2017 | Chen | ........................ | G02B 6/14 |
| 10,107,960 B2* | 10/2018 | Hickey | ................ | G02B 6/1221 |
| 10,345,524 B2* | 7/2019 | Jiang | ........................ | G02B 6/14 |
| 10,852,484 B2* | 12/2020 | Testa | ..................... | G02B 6/4202 |
| 2004/0057667 A1 | 3/2004 | Yamada et al. | | |
| 2008/0193079 A1* | 8/2008 | Cheben | ..................... | G02B 6/14 |
| | | | | 385/28 |
| 2012/0076465 A1 | 3/2012 | Chen et al. | | |

(Continued)

FOREIGN PATENT DOCUMENTS

JP 2016156928 A 9/2016

*Primary Examiner* — Michelle R Connelly
*Assistant Examiner* — Kirsten D. Endresen
(74) *Attorney, Agent, or Firm* — PERRY + CURRIER INC.

(57) ABSTRACT

An example device comprises: a substrate comprising a waveguide material having a waveguide refractive index ($RI_{WG}$); a first layer of oxide on the substrate having an $RI_1$ lower than the $RI_{WG}$; a waveguide on the first oxide layer, the waveguide comprising the waveguide material having the $RI_{WG}$; a second oxide layer on the waveguide and the first oxide layer, the second oxide layer having a second $RI_2$ higher than the $RI_1$ and less than the $RI_{WG}$, the first oxide layer, the waveguide and the second oxide layer forming an end face for light coupling, and the waveguide extending inwards from the end face and increasing in effective RI from the end face; and an index matching material on the second oxide layer that encapsulates at least the second oxide layer and the end face, a respective RI of the index matching material being about index matched to the $RI_1$.

10 Claims, 6 Drawing Sheets

(56) References Cited

U.S. PATENT DOCUMENTS

| | | | |
|---|---|---|---|
| 2018/0120504 A1 | 5/2018 | Qi et al. | |
| 2018/0356596 A1* | 12/2018 | Kumar | G02B 6/305 |
| 2020/0225413 A1* | 7/2020 | Lipson | G02B 6/305 |
| 2021/0271026 A1* | 9/2021 | Bulthuis | G02B 6/12002 |

* cited by examiner

WAVEGUIDE COUPLER

FIELD

The specification relates generally to telecommunication devices, and specifically to a fiber-to-silicon on insulator (SOI) photonics waveguide coupler having a thick upper cladding.

BACKGROUND

Optical coupling into and out of waveguides in photonic integrated structures can have reduced efficiencies due to light leaking out of the waveguides at the edge of the structure interacting with oxides encapsulating the waveguide, as well as insulator layers between the waveguide and a substrate. The losses occur mainly due to differences in indices of refraction between the waveguide, the insulator layers and the encapsulating oxides; the losses can be particularly acute when silicon substrates are used.

U.S. Pat. No. 10,107,960, issued Oct. 23, 2018, the contents of which are incorporated herein by reference, describes a device that includes a substrate with an opening formed adjacent to an edge, a layer of insulator (e.g. an oxide material, a thermal oxide material, a nitride material, and the like) that forms a bridge across the opening and a waveguide thereupon. Optical epoxy that is indexed matched to the insulator is located in the opening. Any encapsulating insulators and/or oxides and/or nitrides on at least a tapered region of the waveguide at the edge, are replaced with optical epoxy using, for example, etching techniques to remove the encapsulating insulators. The thicknesses of the optical epoxies are selected to contain optical signals leaking from the waveguide in the tapered region. Replacing the substrate and the encapsulating insulator adjacent to the tapered region with index matched epoxy can reduce the losses due to differences in refractive index between the insulator and the substrate, and between the insulator and the encapsulating insulator.

SUMMARY

As set forth herein, a fiber-to-SOI photonics waveguide coupler is set forth that uses a thick upper cladding to support evanescently coupling light into a sub waveguide.

An advantage of the waveguide coupler set forth herein is that it eliminates any requirement to undercut the buried oxide layer, as required for example in U.S. Pat. No. 10,107,960, resulting in simple fabrication of the waveguide coupler.

An aspect of the present specification provides a device comprising: a substrate comprising a waveguide material having a waveguide refractive index; a first layer of oxide material on the substrate having a first refractive index lower than the waveguide refractive index; an optical waveguide on the first layer of the oxide material, the optical waveguide comprising the waveguide material having the waveguide refractive index; a second layer of the oxide material on the optical waveguide and the first layer of the oxide material, the second layer of the oxide material having a second refractive index higher than the first refractive index and less than the waveguide refractive index, the first layer of the oxide material, the optical waveguide and the second layer of the oxide material forming an end face for light coupling, and the optical waveguide extending inwards from the end face and increasing in effective refractive index from the end face; and an index matching material on the second layer of the oxide material that encapsulates at least the second layer of the oxide material and the end face, a respective refractive index of the index matching material being about index matched to the first refractive index.

An aspect of the present specification provides a method comprising: providing a device comprising: a substrate comprising a waveguide material having a waveguide refractive index; a first layer of oxide material on the substrate having a first refractive index lower than the waveguide refractive index; an optical waveguide on the first layer of the oxide material, the optical waveguide comprising the waveguide material having the waveguide refractive index; a second layer of the oxide material on the optical waveguide and the first layer of the oxide material, the second layer of the oxide material having a second refractive index higher than the first refractive index and less than the waveguide refractive index, the first layer of the oxide material, the second layer of the oxide material, and the optical waveguide forming an end face for light coupling, and the optical waveguide extending inwards from the end face and increasing in effective refractive index from the end face; and encapsulating at least the second layer of the oxide material and the end face with an index matching material, a respective refractive index of the index matching material being about index matched to the first refractive index.

BRIEF DESCRIPTION OF THE DRAWINGS

For a better understanding of the various examples described herein and to show more clearly how they may be carried into effect, reference will now be made, by way of example only, to the accompanying drawings in which.

Figure 1:
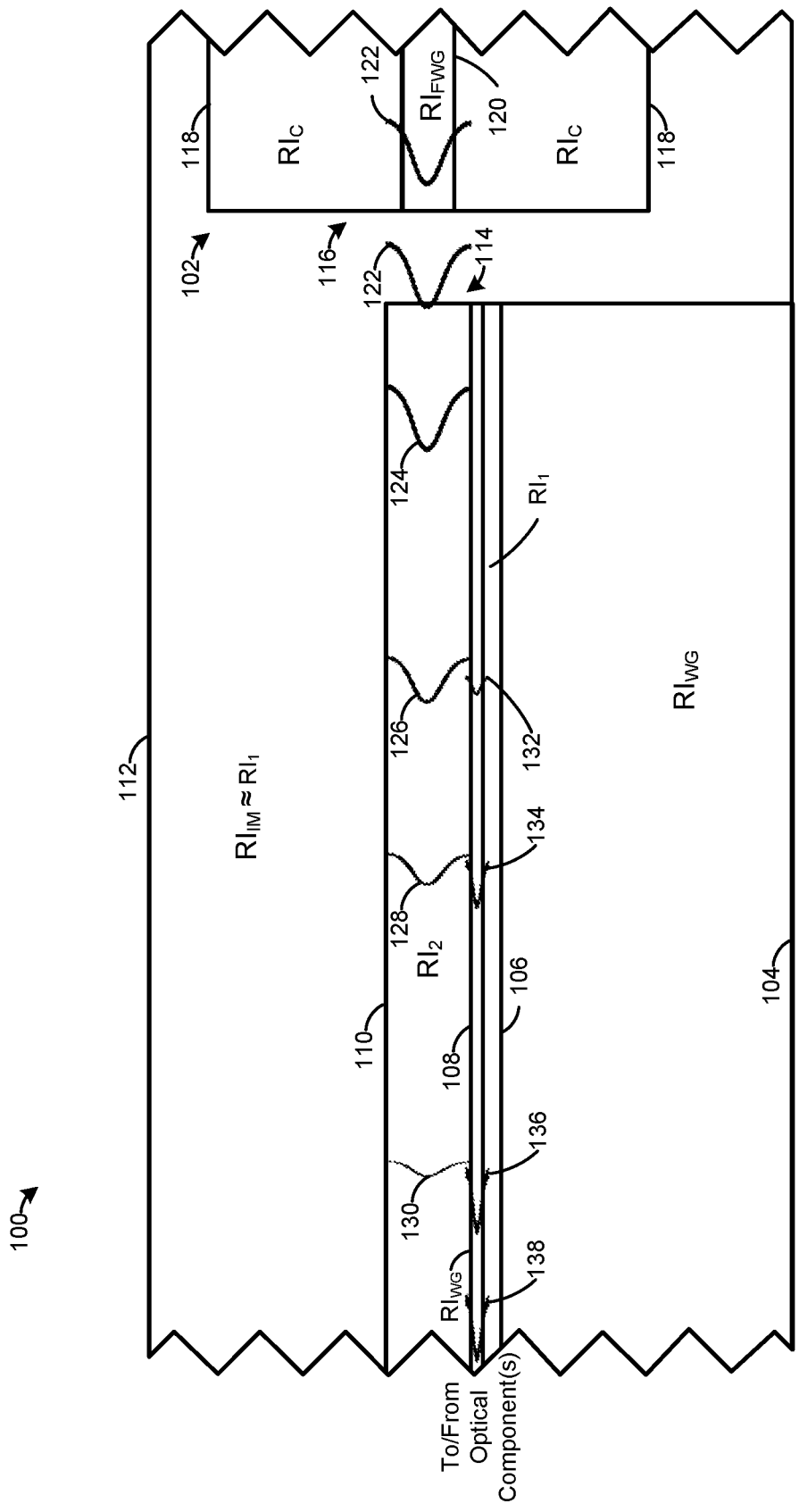
FIG. 1 depicts a schematic view of a waveguide coupler, according to non-limiting examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

With reference to FIG. 1 an optical coupler device 100 is depicted for transferring light to or from a single mode optical fiber 102 to a silicon-on-insulator (SOI) waveguide with low loss, though it is understood that any suitable semiconductor-on-insulator material is within the scope of present specifications. The device 100 is understood to be depicted schematically, with the view depicted representing a cross-section of the device 100, for example through a plane that perpendicularly intersects the layers of the device 100 and the optical fiber 102, and in particular perpendicularly intersects respective optical waveguides of the device 100 and the optical fiber 102.

The device 100 comprises five optical semiconducting or dielectric layers: a substrate 104, a first layer 106 of oxide material, an optical waveguide 108, a second layer 110 of oxide material, and an index matching material 112. The layers are next described.

An initial layer comprises a substrate 104 comprising a waveguide material having a waveguide refractive index $RI_{WG}$. In some examples, the substrate 104 may comprise and/or be made of silicon (Si), and may colloquially be referred to as an SOI handle.

A first layer 106 of oxide material is "above" and/or on the substrate 104. The first layer 106 has a first refractive index $RI_1$ lower than the waveguide refractive index $RI_{WG}$. The first layer 106 of oxide material may comprise a layer of silicon oxide (SiO2) dielectric (e.g. buried insulator oxide). Hence, the first layer 106 of oxide material may comprise an oxide of the material of the substrate 104. It is further understood that references to one layer (and the like) being "above" another layer, as used herein, use the substrate 104 as a bottom-most reference layer; for example, a layer described herein may be above another layer presuming the substrate 104 is a lowest and/or bottom-most layer.

An optical waveguide 108 is generally on the first layer 106 of the oxide material, the optical waveguide 108 comprising the waveguide material having the waveguide refractive index $RI_{WG}$. Put another way, the optical waveguide 108 may comprise the same waveguide material as the substrate 104, and hence may comprise a silicon waveguide layer. Furthermore, the optical waveguide 108 may be referred to as being "above" or "on" the "buried insulator oxide" of the first layer 106. The optical waveguide is understood to be of a cross-sectional shape that is suitable for guiding light into and out of the device 100, for example to, or from, one or more optical components (not depicted) within the device 100, such as modulators or demodulators, and the like. A shape of the optical waveguide 108 is described in more detail below with respect to FIG. 2 and FIG. 3. However, it is understood that the optical waveguide 108 is generally narrower in width than the first layer 106 of the optical material (e.g. in a direction into or out of the page of FIG. 1).

A second layer 110 of the oxide material (e.g. the same optical material as the first layer 106) is generally on the optical waveguide 108 and the first layer 106 of the oxide material, the second layer 110 of the oxide material having a second refractive index $RI_2$ higher than the first refractive index $RI_1$ and less than the waveguide refractive index $RI_{WG}$. Furthermore, the second layer 110 may be thicker than the first layer 106, and hence may be referred to as a "thick dielectric" slab waveguide layer (e.g. which may comprise a form or doped or undoped SiO$_2$).

The first layer 106 of the oxide material may be referred to as an undercladding layer, as the first layer 106 of the oxide material is "under" the optical waveguide 108 (e.g. with reference to the substrate 104 as a base and/or lowest layer of the device 100). Similarly, the second layer 110 of the oxide material may be referred to as an overcladding layer, as the second layer 110 of the oxide material is "over" and/or around the optical waveguide 108. Hence, together, the layers 106, 110 generally act as cladding layers for the optical waveguide 108, similar to cladding of an optical fiber. However, as will be explained below, light may enter or exit the device 100 via the first layer 106 of the oxide material.

In general, the first layer 106 of the oxide material, the optical waveguide 108, and the second layer 110 of the oxide material generally form an end face 114 for light coupling, for example with the optical fiber 102. Furthermore, it is understood that the optical waveguide 108 extends inwards from the end face 114 (e.g. towards the optical components at an interior of the device 100) and that the optical waveguide 108 is increasing in effective refractive index from the end face 114. Put another way, the effective refractive index is understood to be a minimum and/or smallest value adjacent the end face 114 (e.g. similar to the refractive index $RI_2$ of the second layer 110), and increases from the end face 114 towards the interior of the device 100 and may have a maximum value of the waveguide refractive index $RI_{WG}$. Such an increase in effective refractive index may be achieved via a tapered and/or modulated tapered structure described in more detail below with respect to FIG. 2 and FIG. 3.

The index matching material 112 is generally on the second layer 110 of the oxide material, and the index matching material 112 generally encapsulates at least the second layer 110 of the oxide material and the end face 114. Furthermore, a respective refractive index $RI_{IM}$ of the index matching material 112 is selected to be about index matched to the first refractive index $RI_1$ of the first layer 106 of the oxide material. The index matching material 112 may comprise any suitable optical epoxy selected to have a refractive index that is about index matched to the first refractive index $RI_1$ of the first layer 106 of the oxide material.

The index matching material 112 may be colloquially referred to as a super-cladding layer that encapsulates the other layers of the device 100 and is generally understood to further encapsulate a fiber end face 116 of the optical fiber 102, such that the index matching material 112 acts as a transition optical index material between the fiber end face 116 of the optical fiber 102 and the end face 114 of the device 100.

While the index matching material 112 is depicted as being between the end faces 114, 116, and uniformly encapsulating the second layer 110, the index matching material 112 may not uniformly encapsulate the second layer 110, but rather the index matching material 112 may be thickest in a region between and/or adjacent the end faces 114, 116, and taper off in thickness away from the region between and/or adjacent the end faces 114, 116. Indeed, the index matching material 112 may have any suitable shape and/or physical profile, as long as the index matching material 112 contains light travelling and/or being conveyed between the end faces 114, 116 and further assists at containing light within the layers 106, 110 and the optical waveguide 108 (e.g. without light leaking out of the index matching material 112 and/or the layers 106, 110 and the optical waveguide 108).

In particular, control and/or selection of the refractive indices of the layers 106, 110, and the optical waveguide 108, along with the thickness of the layers 106, 110, and the optical waveguide 108 may assist with coupling of light into, and out of, the device 100.

In general, using silicon as an example, a combination of the substrate 104, the layers 106, 110, and the optical waveguide 108 may be manufactured by starting with the substrate 104 made of silicon, and growing the first layer 106 of the oxide material, such as SiO2, on the substrate 104 using any suitable technique (e.g. such as chemical vapor deposition (CVD), and the like). A layer of Si may be grown on the first layer 106 using any suitable technique, and the layer of Si may be suitably etched, and the like, to form the optical waveguide 108. The second layer 110 of the oxide material, such as SiO2, may be grown on the optical waveguide 108 and the first layer 106 using any suitable technique (e.g. such as chemical vapor deposition (CVD), and the like); for example, as the optical waveguide 108 is narrower than the first layer 106, the second layer 110 on either side of the optical waveguide 108 (e.g. along an optical axis and/or longitudinal axis of the optical waveguide 108) is exposed and, as such, the second layer 110 is grown on both the optical waveguide 108 and the first layer 106.

Ideally, the respective refractive indices $RI_1$, $RI_2$ of the layers 106, 110 are the same or about the same. However, in practice it is challenging using current manufacturing techniques to achieve this. For example, in the manufacturing process described above, the refractive index $RI_1$ of the second layer 110 tends to be higher than the refractive index $RI_1$ of the first layer 106.

This leads to coupling problems when light from the optical fiber 102 is coupled into the optical waveguide 108.

For example, in general, the optical fiber 102 may comprise a single mode optical fiber, that comprises a cladding layer 118 that is cylindrically arranged around a fiber optical waveguide 120 through which light 122 is conveyed. It is understood that the refractive index $RI_C$ of the cladding layer 118 is less than the refractive index $RI_{FWG}$ of the fiber optical waveguide 120 such that total internal reflection contains the light 122 within the fiber optical waveguide 120.

As depicted, the light 122 is being conveyed out of the fiber optical waveguide 120 and exits the optical fiber 102 at the fiber end face 116. In general, in prior art optical couplers, the fiber end face 116 and/or the optical waveguide 120 would be centered on the optical waveguide 108 of the device 100 and no index matching material 112 would be present. However, due to the refractive index $RI_2$ of the second layer 110 of oxide material being higher the refractive index $RI_1$ of the first layer 106 of oxide material, when the fiber end face 116 and/or the optical waveguide 120 is centered on the optical waveguide 108 of the device 100, the light 122 generally leaks into the substrate 104 and may be lost, a situation which is exacerbated by the optical waveguide 108 being further generally manufactured with an increasing effective refractive index (e.g. a tapered structure). While FIG. 1 shows the light 122 exiting the optical fiber 102 and entering the end face 114, it is understood that the light 122 may exit the end face 114, and enter the optical fiber 102; however, a similar problem exists in this situation when the index matching material 112 is absent.

The problem may be at least partially addressed by using the second layer 110 of the oxide material (e.g. the thick dielectric slab waveguide layer) to couple the light 122 to and from the optical fiber 102. In particular, as the refractive index $RI_1$ of the second layer 110 is greater than both the refractive index $RI_1$ of the first layer 106 of the oxide material, and the refractive index $RI_{IM}$ of the index matching material 112, the second layer 110 of the oxide material effectively acts, at least at the end face 114, as an optical waveguide to couple the light 122 into, and out of, the coupler device 100. Put another way, at the end face 114, the effective refractive index of the optical waveguide 108 is at a minimum and/or at about the refractive index $RI_2$ of the second layer 110 of the oxide material. Hence, at the end face 114, the light 122 interacts with the second layer 110 of the oxide material acting as an optical waveguide at a higher refractive index $RI_2$, higher than the refractive index $RI_1$ of the first layer 106 of the oxide material and the index matching material 112, which effectively act as cladding relative to the second layer 110 of the oxide material. Put another way, at the end face 114, the combination of the second layer 110 of the oxide material surrounded by the first layer 106 of the oxide material and the index matching material 112 form a similar optical structure as the optical fiber 102.

Put yet another way, the thick dielectric slab "waveguide" second layer 110 couples light to and from the optical fiber 102, and the refractive index of the second layer 110 is generally greater than both the "sub-insulating" dielectric layer 106 and the super-cladding index matching material 112. Furthermore, the optical waveguide 108 is is shaped to adjust the effective "optical mode" refractive index and provide a transition mechanism to couple light into or out of the thick dielectric slab "waveguide" second layer 110, to or from the thick dielectric slab "waveguide" second layer 110.

For example, as depicted, the light 122 is depicted at different positions 124, 126, 128, 130 as it travels through the second layer 110. Each subsequent position 124, 126, 128, 130 is further from the end face 114, and towards the interior of the device 100 (e.g. towards the internal optical components). Furthermore, at subsequent position 124, 126, 128, 130, the effective refractive index of the optical waveguide 108 is understood to increase.

At the first position 124, immediately adjacent the end face 114, the light 122 has about the same intensity as when entering the end face 114; the light. However, at the next position 126, further towards the interior of the device 100, a portion 132 of the light has leaked into the optical waveguide 108. At yet a next position 128, yet further towards the interior of the device 100, a larger portion 134 of the light has leaked into the optical waveguide 108. Similarly, at yet a next position 130, yet further towards the interior of the device 100, a subsequently larger portion 136 of the light has leaked into the optical waveguide 108 until, at yet a further position, all of the light 122 has leaked into the optical waveguide 108 as light 138. At the position where the light 138 is depicted, it is understood that the effective refractive index of the optical waveguide 108 has increased to the refractive index $RI_{WG}$ of the waveguide material. Furthermore, it is understood that the length of the optical waveguide 108 over which the refractive index increases from the minimum at the end face 114 to (e.g., at least approaching) the refractive index $RI_{WG}$ of the waveguide material is selected to promote the leaking of a maximum portion of the light 122 into the optical waveguide 108 (though some loss may occur). Indeed, the length of the optical waveguide 108 is understood to be selected such that the light 138 is detectible and/or processible by the optical components of the device 100.

It is further understood that the depicted process is reversible. For example, the light 138 travelling towards the end face 114 will generally leak into the second layer 110 and exit the end face 114 at the second layer 110 and into the optical waveguide 120 of the optical fiber 102. Hence, light can be coupled to and from the optical fiber 102, and to and from the optical waveguide 108 via the second layer 110. Hence, it is further understood that the length of the optical waveguide 108 is understood to be selected such that light 138 travelling towards the end face 114, that generally leaks into the second layer 110 and exits the end face 114 at the second layer 110 and into the optical waveguide 120 of the optical fiber 102, is i detectible and/or processable by the optical components that receive such light via the optical fiber 102. Hence it is understood that the length of the optical waveguide 108 is any suitable length, which may be determined heuristically.

In some examples, the "insulating" index matching material 112 is in a range of between about 2 μm to about 3 μm thick, the optical waveguide 108 is in a range of between about 100 nm to about 300 nm thick, and the second layer 110 of the oxide material is in a range of between about 7 μm and about 10 μm thick. Furthermore, the widths of the optical waveguide 108 and the second layer 110 may be any suitable values, which may be determined heuristically to promote leakage therebetween as described above. However, it is understood that while certain dimensions are described herein for the various components of the device 100, such dimensions are not meant to be exhaustive, and functionality of the device 100 as described herein may be achieved with other dimensions.

Furthermore, in some examples, the waveguide material and/or the optical waveguide 108 may comprise silicon, and the oxide material of the layers 106, 110 may comprise silicon oxide. As such, the refractive index $RI_{WG}$ of the waveguide material of the optical waveguide 108 may be about 3.4 (e.g. the refractive index of silicon), the refractive index $RI_2$ of the oxide material of the second layer 110 may be in a range of about 1.44 to about 1.46 (e.g. the refractive index of a doped silicon oxide), and the refractive index $RI_1$ of the oxide material of the first layer 106 and the refractive index $RI_{IM}$ of the index matching material 112 may each be about in a range of about 1.43 to about 1.45 (e.g. the refractive index of silicon oxide). However, it is further understood that the refractive index $RI_1$ of the oxide material of the first layer 106 and the refractive index $RI_{IM}$ of the index matching material 112 also satisfies a condition of being less than the refractive index $RI_2$ of the oxide material of the second layer 110.

Figure 2:
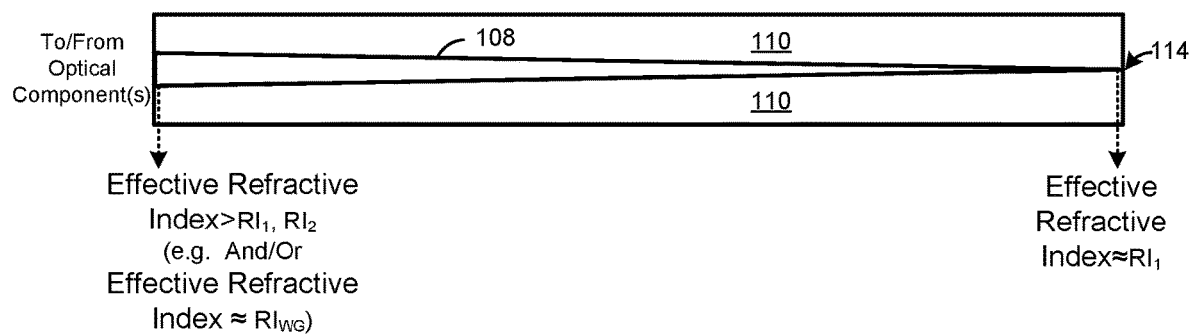
FIG. 2 depicts a tapered structure of an optical waveguide of the device of FIG. 1, according to non-limiting examples.
Figure 3:
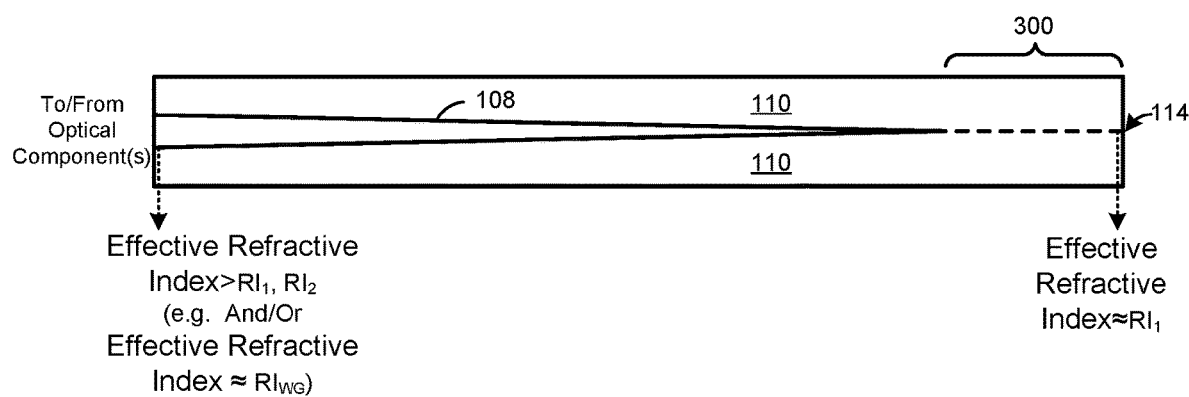
FIG. 3 depicts a modulated tapered structure of an optical waveguide of the device of FIG. 1, according to further non-limiting examples.

Control of the effective index of the optical waveguide 108 is next described with respect to FIG. 2 and FIG. 3.

For example, FIG. 2 and FIG. 3 each show a "downward" view of examples of the optical waveguide 108 and the second layer 110, for example in a direction of the substrate 104 perpendicular to an optical axis and/or longitudinal axis of the optical waveguide 108. As depicted, the second layer 110 surrounds, and/or is located on opposite sides of the optical waveguide 108.

In particular, FIG. 2 depicts a tapered structure of the optical waveguide 108, while FIG. 3 depicts a modulated tapered structure of the optical waveguide 108. The optical waveguide 108 may be manufactured according to either of the depicted structures, both of which cause the effective refractive index of the optical waveguide 108 to increase from the end face 114 towards the interior of the device 100.

With reference to FIG. 2, the waveguide material of the optical waveguide 108 is tapered and increasing in width from the end face 114 inwards. In particular, as depicted, at the end face 114, the waveguide material of the optical waveguide 108 is at a point and/or tip of the tapering, and towards the interior of the device 100 increases in width. As such, and as the second layer 110 surrounds, and/or is located on opposite sides of the optical waveguide 108 at the end face 114, the effective refractive index of the optical waveguide 108 is formed by a combination of the refractive index $RI_2$ of the oxide material of the second layer 110 and the refractive index $RI_{WG}$ of the waveguide material of the optical waveguide 108. As the width of the waveguide material of the optical waveguide 108 at the end face 114 is at a point, and/or very narrow as compared to the respective width of the oxide material of the second layer 110, at the end face 114, the effective refractive index of the optical waveguide 108 may be about equal to the refractive index $RI_2$ of the oxide material of the second layer 110. However, as the width of the waveguide material of the optical waveguide 108 increases, the contribution to the effective index by the refractive index $R_{WG}$ of the waveguide material increases and the effective refractive index of the optical waveguide 108 also increases to be greater than both the refractive indices $RI_1$, $RI_2$ of the oxide material of the layers 106, 110. Indeed, the effective index of the optical waveguide 108 may approach, and/or be about equal to, the refractive index $RI_{WG}$ of the waveguide material, for example, as light exits (or enters) the optical waveguide 108 at the interior of the device 100 (e.g. to or from the interior optical components).

With reference to FIG. 3, the waveguide material of the optical waveguide 108 may alternatively have a modulated taper structure, which may have similar optical properties as the tapered structure of FIG. 2.

In particular, the modulated taper structure comprises: separated portions of the waveguide material extending inwards from the end face 114 for a given length 300; and thereafter a taper structure extending inwards from the end face 114. Put another way, the modulated taper structure is similar to the tapered structure of FIG. 2, but there are separated portions of the waveguide material between a tip and/or point of a tapered structure and the end face 114, the modulated taper structure comprising separated dots and/or separated lines of the waveguide material that are aligned along a longitudinal axis of the tapered structure. Such a modulated tapered structure may have similar optical properties as the tapered structure of FIG. 2, but the effective refractive index along the given length 300 may increase less than the effective refractive index along a similar length of the tapered structure of FIG. 2.

While two example structured for the optical waveguide 108 are depicted, it is understood that any suitable structure for the optical waveguide 108 that provides an increasing effective refractive index from the end face 114 is within the scope of the present specification.

It is further understood that, regardless of the structure of the optical waveguide 108, the fiber end face 116 and the optical waveguide 120 of the optical fiber 102 is about aligned with the second layer 110 of the oxide material, for example about centered on the second layer 110 of the oxide material, and adjacent to and/or "above" the optical waveguide 108 of the device 100. Indeed, the optical waveguide 120 of the optical fiber 102 may be aligned with the second layer 110 of the oxide material, and about centered on line that is through a center of the optical waveguide 108 and perpendicular to a longitudinal axis of the optical waveguide 108.

Figure 4:
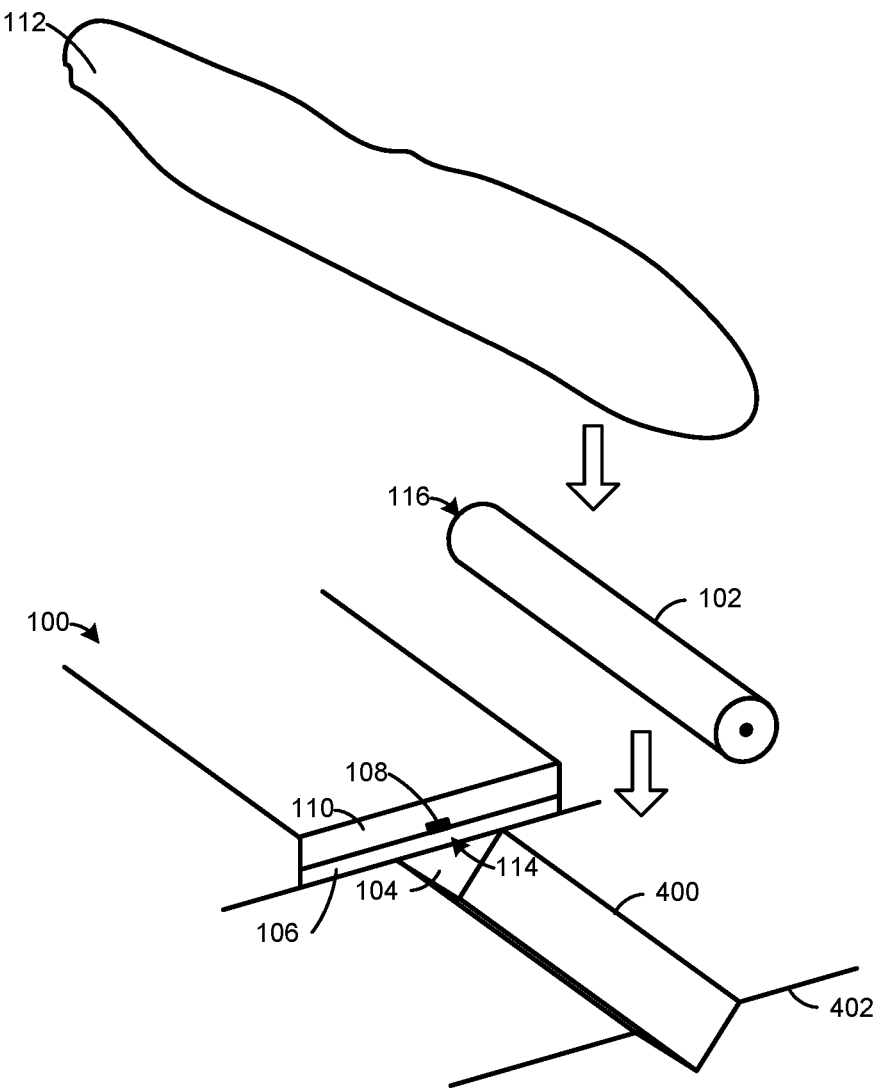
FIG. 4 depicts a perspective view of the device 100 of FIG. 1, as being assembled, and further showing an alignment structure, according to further non-limiting examples.

While such alignment of the optical fiber 102 with the second layer 110 of the oxide material may occur in any suitable manner, in some examples, and with reference to FIG. 4, which schematically shows a perspective view of the device 100 and the optical fiber 102 being assembled, the device 100 may comprise an alignment structure 400, extending outward from the end face 114 (e.g. away from the interior of the device 100 and/or towards an exterior edge 402 of the device 100), the alignment structure 400 configured to about center the fiber end face 116 of the optical fiber 102 with the second layer 110 of the oxide material at the end face 114, such that light from the optical fiber 102 enters the second layer 110 of the oxide material at the end face 114, or respective light from the second layer 110 of the oxide material enters the optical fiber 102 at the fiber end face 116.

It is further understood that only a portion of optical fiber 102 is depicted in FIG. 4, and the optical fiber 102 may extend out of the page of FIG. 4 for tens, hundreds or thousands of meters, or more. Furthermore, FIG. 4 only depicts a portion of the device 100, which may include a plurality of optical waveguides 108, etc., with a plurality of corresponding alignment structures 400, to interface with a plurality of optical fibers 102.

In particular, FIG. 4 further graphically depicts a method to assemble the optical fiber 102 and the device 100. For example, an end of the optical fiber 102 that includes the fiber end face 116, is lowered and/or placed into the alignment structure 400, and the alignment structure has a shape that, when end the optical fiber 102 that includes the fiber end face 116 is lowered and/or placed into the alignment structure 400, the alignment described with respect to FIG. 1 is achieved (e.g. the optical waveguide 120 of the optical fiber 102 is aligned with the second layer 110 of the oxide material at the end face 114).

FIG. 4 further shows that the index matching material 112, for example in the form of an optical epoxy, may be used to attach the optical fiber 102 to the device 100, and fill the region between the end faces 114, 116, as well as cover the second layer 110. However, any suitable combination of the index matching material 112 and another epoxy, and the like, may be used to attach the optical fiber 102 to the device 100.

In particular, as depicted, and the alignment structure 400 may comprise a V-shaped groove extending outwards from the end face 114, which may be formed from the material of the substrate 104, which may extend outward from the end face 114 to the depicted edge 402, with the layers 106, 110 and the optical waveguide 108 grown on the substrate 104 adjacent the alignment structure 400, though the alignment structure 400 may be formed before or after formation of the layers 106, 110 and the optical waveguide 108, and/or at any suitable point in the manufacturing of the device 100. In particular, the V-shaped groove of the alignment structure 400 may etched into the substrate 104.

Figure 5:
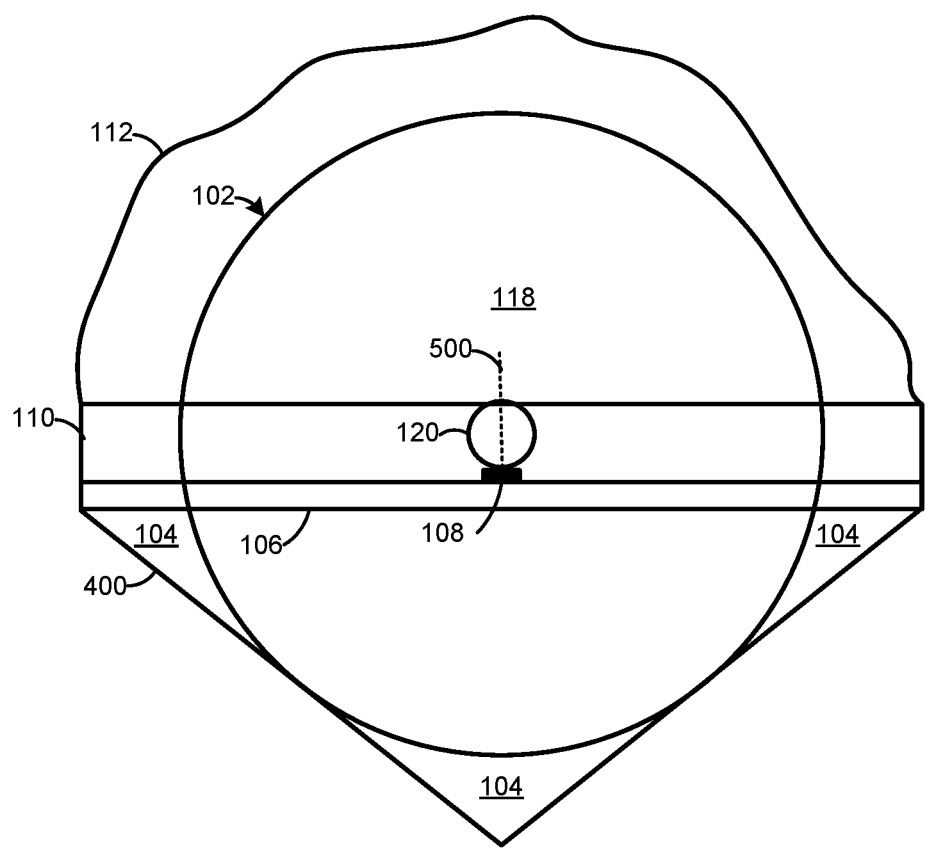
FIG. 5 depicts an end view of the device 100 of FIG. 1 with the alignment structure of FIG. 4, according to further non-limiting examples.

An end view of the V-shaped groove of the alignment structure 400 is further depicted in FIG. 5, after assembly of the device 100 and the optical fiber 102, the view of the V-shaped groove of the alignment structure 400 being along an optical axis of the optical waveguide 120 of the optical fiber 102. Components of the optical fiber 102 are depicted as being transparent to show their positions relative to the components of the device 100.

As clearly seen in FIG. 5, sides of the optical fiber 102 are resting and/or held into place in the V-shaped groove of the alignment structure 400 (e.g. by the optical epoxy of the index matching material 112, and/or another epoxy, and the like), such to achieve the alignment between the optical waveguide 120 of the optical fiber 102 and the second layer 110 of the oxide material. As such, it is understood that slopes of sides of the V-shaped groove of the alignment structure 400, and a depth of the V-shaped groove of the alignment structure 400 are selected to achieve such alignment.

FIG. 5 further shows that the optical waveguide 120 of the optical fiber 102 is aligned with the second layer 110 of the oxide material, and about centered on a line 500 that is through a center of the optical waveguide 108 and perpendicular to a longitudinal axis of the optical waveguide 108 (e.g. which is understood to be normal to the page of FIG. 5).

FIG. 5 further shows that the index matching material 112 may have any suitable shape on the optical fiber 102 and the second layer 110.

Figure 6:
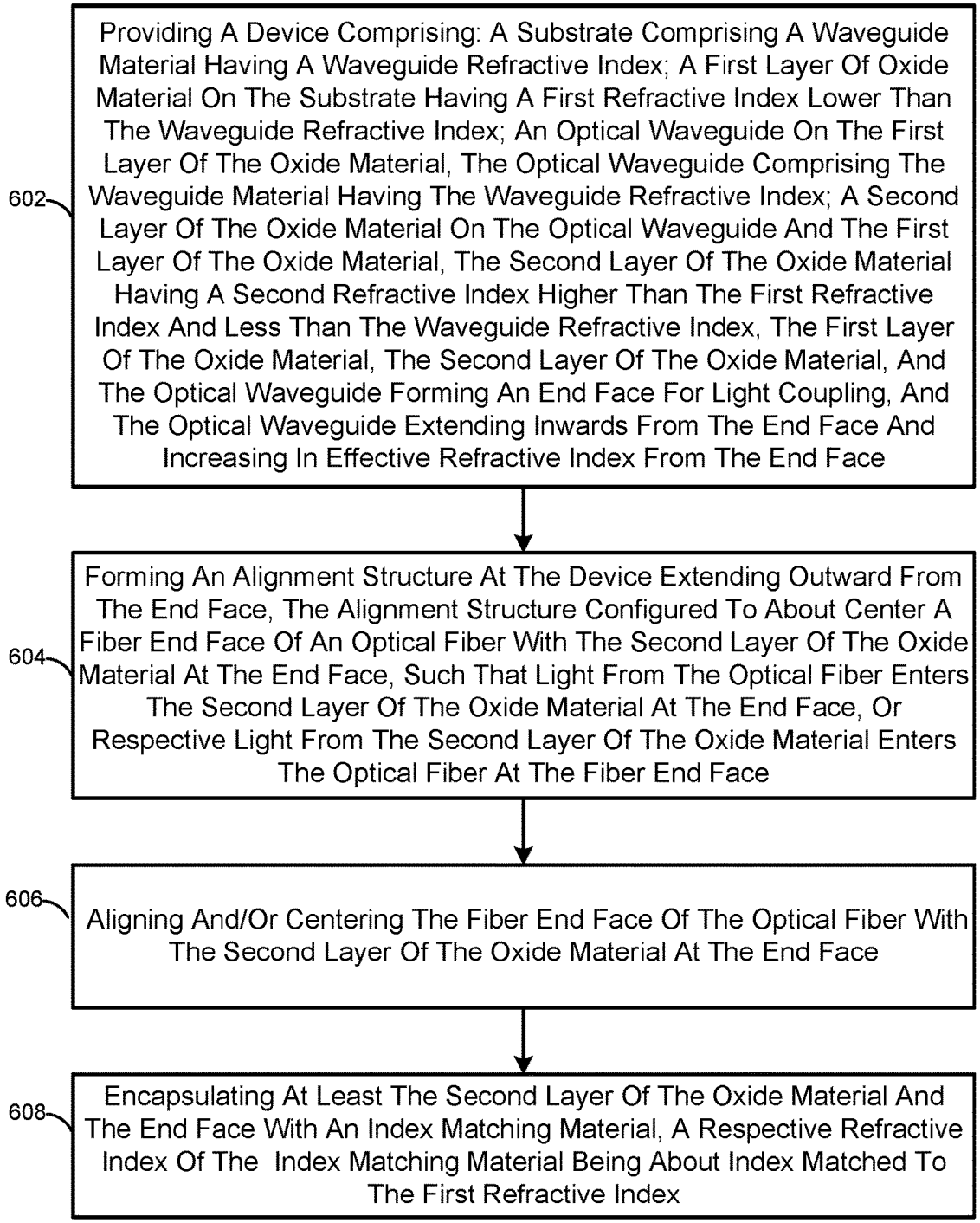
FIG. 6 depicts a method for manufacturing a waveguide coupler device, according to further non-limiting examples.

Attention is next directed to FIG. 6 which depicts a method 600 for manufacturing a waveguide coupler device, such as the device 100 combined with the optical fiber 102.

At a block 602, the device 100 is provided, the device 100 comprising:

a substrate 104 comprising a waveguide material having a waveguide refractive index;

a first layer 106 of oxide material on the substrate 104 having a first refractive index lower than the waveguide refractive index;

an optical waveguide 108 on the first layer of the oxide material, the optical waveguide 108 comprising the waveguide material having the waveguide refractive index;

a second layer 110 of the oxide material on the optical waveguide 108 and the first layer 106 of the oxide material, the second layer 110 of the oxide material having a second refractive index higher than the first refractive index and less than the waveguide refractive index, the first layer 106 of the oxide material, the second layer 110 of the oxide material, and the optical waveguide 108 forming the end face 114 for light coupling, and the optical waveguide 108 extending inwards from the end face 114 and increasing in effective refractive index from the end face 114.

In particular, the device 100 may be manufactured using any suitable combination of deposition techniques, etching techniques and the like.

At a block 604, an alignment structure 400 is formed at the device 100 extending outward from the end face 114, the alignment structure 400 configured to about center a fiber end face 116 of an optical fiber 102 with the second layer 110 of the oxide material at the end face 114, such that light from the optical fiber 102 enters the second layer 110 of the oxide material at the end face 114, or respective light from the second layer 110 of the oxide material enters the optical fiber 102 at the fiber end face 116.

The alignment structure 400 may comprises a V-shaped groove extending outwards from the end face 114, for example formed via etching in the substrate 104.

As any suitable alignment structure and/or method of alignment is within the scope of the present specification, the block 604 may be optional.

At a block 606, the fiber end face 116 of the optical fiber 102 is aligned and/or centered with the second layer 110 of the oxide material at the end face 114. As any suitable alignment structure and/or method of alignment is within the scope of the present specification, the block 606 may also be optional and/or inherent an inherent component of the block 602 and/or the block 604.

At a block 608, at least the second layer 110 of the oxide material and the end face 114 are encapsulated with the index matching material 112, a respective refractive index of the index matching material 112 being about index matched to the first refractive index of the first layer 110. In particular, the index matching material 112 may fill any gap between the end faces 114, 116, and further encapsulates that portion of the second layer 110 where light is travelling therethrough, as described above with respect to FIG. 5.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that there are yet more alternative examples and modifications possible, and that the above examples are only illustrations of one or more embodiments. The scope, therefore, is only to be limited by the claims appended hereto.

What is claimed is:

1. A device comprising:
a substrate comprising a waveguide material having a waveguide refractive index;
a first layer of oxide material on the substrate having a first refractive index less than the waveguide refractive index;
an optical waveguide on the first layer of the oxide material, the optical waveguide comprising the waveguide material having the waveguide refractive index;
a second layer of the oxide material on the optical waveguide and the first layer of the oxide material, the second layer of the oxide material having a second refractive index higher than the first refractive index and less than the waveguide refractive index,
the first layer of the oxide material, the optical waveguide and the second layer of the oxide material forming an end face for light coupling, and the optical waveguide extending inwards from the end face and increasing in effective refractive index from the end face;
an index matching material on the second layer of the oxide material that encapsulates at least the second layer of the oxide material and the end face, a respective refractive index of the index matching material being about index matched to the first refractive index, such that the respective refractive index of the index matching material is:
 about the same as the first refractive index of the first layer of the oxide material;
 less than the second refractive index of the second layer of the oxide material; and
 less than the waveguide refractive index;
an optical fiber; and
an alignment structure extending outward from the end face, the alignment structure configured to about center a fiber end face of the optical fiber with the second layer of the oxide material at the end face, such that light from the optical fiber enters the second layer of the oxide material at the end face, or respective light from the second layer of the oxide material, that has leaked into the second layer of the oxide material from the optical waveguide, enters the optical fiber at the fiber end face,
and wherein the second layer of the oxide material extends along, and adjacent to, the optical waveguide, such that light from the optical fiber that enters the second layer of the oxide material leaks into the optical waveguide along a length of the optical waveguide, or the respective light from the optical waveguide leaks into the second layer of the oxide material along the length of the optical waveguide.

2. The device of claim 1, wherein the waveguide material and the optical waveguide comprise silicon, and the oxide material comprises silicon oxide.

3. The device of claim 1, wherein the alignment structure comprises a V-shaped groove extending outwards from the end face.

4. The device of claim 1, wherein the optical waveguide is tapered and increasing in width from the end face inwards.

5. The device of claim 1, wherein the optical waveguide comprises a modulated taper structure.

6. The device of claim 5, wherein the modulated taper structure comprises: separated portions of the waveguide material extending inwards from the end face for a given length; and thereafter a taper structure extending inwards from the end face.

7. The device of claim 1, wherein the light from the optical fiber that enters the second layer of the oxide material at the end face leaks into the optical waveguide due the increasing of the effective refractive index of the optical waveguide from the end face.

8. A method comprising:
providing a device comprising: a substrate comprising a waveguide material having a waveguide refractive index; a first layer of oxide material on the substrate having a first refractive index less than the waveguide refractive index; an optical waveguide on the first layer of the oxide material, the optical waveguide comprising the waveguide material having the waveguide refractive index; a second layer of the oxide material on the optical waveguide and the first layer of the oxide material, the second layer of the oxide material having a second refractive index higher than the first refractive index and less than the waveguide refractive index, the first layer of the oxide material, the second layer of the oxide material, and the optical waveguide forming an end face for light coupling, and the optical waveguide extending inwards from the end face and increasing in effective refractive index from the end face;
forming an alignment structure at the device extending outward from the end face, the alignment structure configured to about center a fiber end face of an optical fiber with the second layer of the oxide material at the end face, such that light from the optical fiber enters the second layer of the oxide material at the end face, or respective light from the second layer of the oxide material, that has leaked into the second layer of the oxide material from the optical waveguide, enters the optical fiber at the fiber end face;
one or more of aligning and centering the fiber end face of the optical fiber with the second layer of the oxide material at the end face using the alignment structure; and
encapsulating at least the second layer of the oxide material and the end face with an index matching material, a respective refractive index of the index matching material being about index matched to the first refractive index, such that the respective refractive index of the index matching material is:
  about the same as the first refractive index of the first layer of the oxide material;
  less than the second refractive index of the second layer of the oxide material; and
  less than the waveguide refractive index, and
wherein the second layer of the oxide material extends along, and adjacent to, the optical waveguide, such that light from the optical fiber that enters the second layer of the oxide material leaks into the optical waveguide along a length of the optical waveguide, or the respective light from the optical waveguide leaks into the second layer of the oxide material along the length of the optical waveguide.

9. The method of claim 8, wherein the alignment structure comprises a V-shaped groove extending outwards from the end face.

10. A device comprising:
  a substrate comprising a waveguide material having a waveguide refractive index;
  a first layer of oxide material on the substrate having a first refractive index less than the waveguide refractive index;
  an optical waveguide on the first layer of the oxide material, the optical waveguide comprising the waveguide material having the waveguide refractive index;
  a second layer of the oxide material on the optical waveguide and the first layer of the oxide material, the second layer of the oxide material having a second refractive index higher than the first refractive index and less than the waveguide refractive index,
  the first layer of the oxide material, the optical waveguide and the second layer of the oxide material forming an end face for light coupling, and the optical waveguide extending inwards from the end face and increasing in effective refractive index from the end face;
  an index matching material on the second layer of the oxide material that encapsulates at least the second layer of the oxide material and the end face, a respective refractive index of the index matching material being about index matched to the first refractive index, such that the respective refractive index of the index matching material is:
    about the same as the first refractive index of the first layer of the oxide material;
    less than the second refractive index of the second layer of the oxide material; and
    less than the waveguide refractive index,
  and wherein the second layer of the oxide material extends along, and adjacent to, the optical waveguide, such that light that enters the second layer of the oxide material leaks into the optical waveguide along a length of the optical waveguide, or respective light from the optical waveguide leaks into the second layer of the oxide material along the length of the optical waveguide.

* * * * *